US005895556A

United States Patent [19]

Ferguson et al.

[11] Patent Number: 5,895,556
[45] Date of Patent: *Apr. 20, 1999

[54] WASTE PAPER TREATMENT PROCESS

[75] Inventors: Loreen D. Ferguson, Vancouver, Wash.; Terrence J. Blain, Oakville, Canada; Jeanette E. Grant, Mississauga, Canada; Christine M. Parent, Kleinburg, Canada

[73] Assignee: ICI Canada Inc., Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/356,163

[22] PCT Filed: Jun. 2, 1993

[86] PCT No.: PCT/CA93/00233

§ 371 Date: Feb. 13, 1995

§ 102(e) Date: Feb. 13, 1995

[87] PCT Pub. No.: WO93/24702

PCT Pub. Date: Dec. 9, 1993

[30] Foreign Application Priority Data

Jun. 2, 1992 [GB] United Kingdom ............... 9211582

[51] Int. Cl.$^6$ ............................................. D21C 5/02
[52] U.S. Cl. ................... 162/5; 162/6; 162/8; 162/13; 162/147; 162/72; 162/189
[58] Field of Search ..................... 162/5, 6, 72, 147, 162/189, 13, 8

[56] References Cited

U.S. PATENT DOCUMENTS

| 3,098,784 | 7/1963 | Gorman | 162/5 |
| 5,055,161 | 10/1991 | Hoffman | 162/147 |
| 5,061,345 | 10/1991 | Hoffman | 162/147 |
| 5,141,598 | 8/1992 | Richmann et al. | 162/5 |
| 5,200,034 | 4/1993 | Richmann et al. | 162/5 |
| 5,234,543 | 8/1993 | Markham et al. | 162/5 |

FOREIGN PATENT DOCUMENTS

| 315709 | 5/1989 | European Pat. Off. . | |
| 434084 | 6/1991 | European Pat. Off. . | |
| 240924 | 10/1925 | United Kingdom | 162/147 |

OTHER PUBLICATIONS

Database WPI, Week 7944, Derwent Publications Ltd., AN 79-79671B & JP. A.54 120 705, Sep. 1979, see abstract.

*Primary Examiner*—Peter Chin
*Attorney, Agent, or Firm*—Pillsbury Madison & Sutro LLP

[57] ABSTRACT

A waste paper treatment process for the recycle and re-use of waste paper, which process comprises treating the waste paper, in a repulper, with a surfactant, in the absence of traditional repulper chemicals such as silicate, caustic and peroxide. The surfactant is preferably a copolymer of ethylene oxide and propylene oxide, and is used in a sufficient concentration to form ink agglomerates. The ink agglomerates are retained on the paper, rather than being removed as in waste paper deinking. The process permits the elimination of normal repulper chemicals, and reduces the amount of ink sludge generated, while providing acceptable brightness levels for the recycled pulp.

16 Claims, No Drawings

WASTE PAPER TREATMENT PROCESS

FIELD OF THE INVENTION

This invention relates to a process for the treatment of waste paper pulps, and in particular to a process for the treatment of waste paper pulps in a repulping stage.

DESCRIPTION OF THE RELATED ART

Because of increasing public demand, the use of recycled paper has steadily increased. To recover the fibres used for papermaking from wastepaper, a waste paper deinking operation must generally be carried out to remove the inks used in printing, and thus create a wastepaper with suitable appearance for re-use. Traditionally, deinking has been conducted by either washing, or flotation deinking.

Wastepaper may contain a mixture of newspapers, magazines, telephone directories, printed advertising material, corrugated containers and the like. The paper fibres used to produce these materials may be chemically pulped materials, such as Kraft pulps, or may be mechanical produced pulps such as groundwood. Much of this wastepaper has undergone some form of printing operation, which printing operation leaves a deposit of ink on the paper. To date, wastepaper recycling has concentrated on removal of the ink, prior to re-use of the recycled waste paper for further printing.

The basic stages in a typical washing or flotation deinking process are: repulping the wastepaper in a repulper; coarse cleaning and screening of the repulped material; deinking; fine cleaning and screening; post-bleaching, and finally, storage.

A key component in a typical old newspaper (ONP) deinking operation is treatment of the waste paper in the repulper. In the repulper, the wastepaper is typically treated in water with chemicals such as caustic soda, sodium silicate and hydrogen peroxide, as described hereinbelow. A metal chelating agent may also be included.

The repulping stage may degrade the resin surrounding the ink particles, while the physical action of the repulper helps to separate the ink from the fibres.

Repulping is followed by a series of coarse cleaners and screens to remove large particles, like staples and plastics from the pulp. The cleaned pulp is passed to either a wash or a flotation deinking stage.

In wash deinking, a large volume of water is passed through the repulped wastepaper which wastepaper is supported on a mesh screen. The ink and other particles are washed through, and away from the pulp.

In flotation deinking, chemicals designed to collect the ink particles together are employed while air bubbles are introduced to the repulped wastepaper. The hydrophobic nature of the ink particles treated with collector chemicals promotes the adherence of the ink to the air bubbles, so that the ink is lifted to the surface of the repulped wastepaper, where it can be removed.

Typically, only one type of deinking is utilized. However, some waste paper treatment mills may employ both washing and flotation deinking processes.

After either process, the deinked, repulped wastepaper is subsequently passed through a series of fine cleaners and screens where the small particles, like sand and grit, are removed.

Additional processing stages may be required, such as for example, dispersion, to reduce the particle size of any contaminants, or a special cleaning stage with special cleaners designed to remove specific contaminants. Further, the repulped wastepaper may also be treated with bleaching chemicals to increase the whiteness and brightness of the pulp.

The deinked wastepaper is then held in storage until it is eventually fed to a paper-making machine. The deinked wastepaper thus provides a furnish of pulp which furnish may be combined with other paper furnishes to produce the saleable paper product.

The chemistry involved in traditional deinking is well known. Caustic soda is used in the repulper to increase the pH and, in some cases, to saponify the resin surrounding the ink particles. Increasing the pH above 7.0, however, will cause yellowing and darkening of the wastepaper stock that contains paper made from groundwood or mechanical pulps. To counteract the undesirable darkening effect, a bleaching agent is added. Traditionally the bleaching agent selected is hydrogen peroxide. Additional chemicals are added to maximize the performance of the bleaching agent. For example, sodium silicate and a metal chelating agent are often added to stabilize the peroxide.

Accordingly, repulping in a deinking mill is traditionally conducted at 8 to 15% consistency (a term used in the paper industry to describe the concentration (w/v) of an aqueous slurry of pulp fibres), at a pH of 9.5 to 11.0, for 5 to 30 minutes, and at a temperature of 40 to 60° C. A typical repulping liquor might comprise 1.5% sodium hydroxide, 3% sodium silicate, and 1% hydrogen peroxide.

The treated pulp exiting the repulper is usually dark in colour, and is subsequently fed to the wash and/or flotation deinking stage for separation of the ink from the pulp.

While the wash deinking stage is generally effective for ink removal, the process generates a considerable volume of effluent that must be treated prior to disposal. Treatment of the effluent for disposal can be expensive. Further, wash deinking often results in low yield and incomplete ink removal which results in low brightness.

Flotation deinking is rapidly becoming the predominant method for ink removal. However, flotation deinking is a sensitive process which can be de-stabilized by variations in the incoming raw materials, ink types, and the like.

Further, the equipment required for either flotation or wash deinking is both large in size, and is costly. Accordingly, pulp and paper mills that wish to incorporate deinked fibres into their stock must invest capital and space for the specialized equipment designed for either wash or flotation deinking.

A further disadvantage of deinking is the separation, collection and disposal of the resultant ink sludge from the process water. Environmentally safe methods of disposing of this ink sludge can lower the economical feasibility of the process.

It has now been found that an improved waste paper treatment process can be effected in the absence of traditional repulping chemicals, by the addition of a surfactant to the liquor used during repulping.

SUMMARY OF THE INVENTION

Accordingly, the present invention provides a waste paper treatment process comprising:

mixing a waste paper, having a plurality of attached ink particles, with water to form an aqueous waste paper slurry;

treating said waste paper slurry with a surfactant, while agitating said slurry so as to dislodge said ink particles from said paper and agglomerate said ink particles into larger diameter ink agglomerates, and thus form a pulp and ink agglomerate mixture; and removing the water from said mixture and collecting said pulp to produce a recycled pulp, wherein, a majority of said ink agglomerates are retained with said recycled pulp, and are present as essentially non-visible agglomerates.

Preferably, the surfactant is a copolymer of ethylene oxide and propylene oxide, and more preferably is a block and/or random copolymer of ethylene oxide and/or propylene oxide. The amount of surfactant is preferably from 0.01 to 1.0% by weight on oven dried pulp, more preferably from 0.2 to 0.5%, and may be added to the water before mixing with the waste paper.

The present process may be followed by a more traditional wash or flotation deinking stage. Preferably, however, recycled paper is generated without the use of these stages, or without the use of the chemicals normally found in these stages.

Accordingly, the present invention also provides a short sequence waste paper repulping process for generating a waste paper pulp comprising:

mixing a waste paper, having a plurality of attached ink particles, with water to form an aqueous waste paper slurry;

treating said waste paper slurry with a surfactant, while agitating said slurry so as to dislodge said ink particles from said paper and agglomerate said ink particles into larger diameter ink agglomerates, and thus form a pulp and ink agglomerate mixture, wherein said slurry is essentially free from added silicate, caustic, and/or hydrogen peroxide; and, feeding said surfactant-treated mixture to a paper-making machine, without the use of a wash or flotation deinking stage, in order to remove the water from said mixture and thus form a recycled pulp, wherein, a majority of said ink agglomerates are retained with said recycled pulp, and are present as essentially non-visible agglomerates.

Most preferably, no silicate, caustic or peroxide are added so that the level of silicate, caustic and hydrogen peroxide is zero. However, the level of silicate, caustic and hydrogen peroxide which might be used in the present invention is generally significantly less than the levels which are traditionally used in repulping operations, as set out hereinabove. Accordingly, the level of silicate, caustic and hydrogen peroxide should be below 0.5%, and more preferably below 0.1%, by weight on oven dried pulp.

In a further aspect, the present invention also provides a treated recycled paper comprising lignocellulosic fibres and a plurality of ink agglomerates dispersed throughout said fibres, which ink agglomerates are essentially non-visible.

DESCRIPTION OF THE PREFERRED EMBODIMENTS

During a typical embodiment of the process of the present invention, waste paper and water are added to a suitable reaction vessel, which can be termed as a repulper, in order to create an aqueous waste paper slurry of a desired solids content. A surfactant is added to the slurry and the slurry is mixed causing the ink particles present on the waste paper to become dislodged from the waste paper pulp.

It has been found that acceptable brightness gains can be achieved in the repulper by adding only a surfactant, and that the traditional repulper chemicals, such as caustic, silicate, and peroxide, can be eliminated. Thus, the surfactant treated pulp may be sent directly to the paper-making machine- without the need for deinking in a wash or flotation deinking apparatus. It is to be understood that the pulp may first be sent to a bleaching stage, storage, dewatering and/or some other treatment stage other than deinking, prior to being sent to the paper-making machine. Further, the pulp may also be added to at least one other pulp furnish prior to being fed to the paper-making machine.

A major feature of the present invention is that the surfactant added aids in the formation of ink agglomerates which agglomerates are essentially non-visible, and are retained with the pulp. During the practise of the present invention, however, some ink particles and/or agglomerates may be removed from the waste paper. However, the process of the present invention allows the majority of the ink, preferably greater than 50% of the ink initially present, contained on the waste paper to be retained with the treated paper as essentially non-visible (i.e. not visible to the naked eye) ink agglomerates.

Typical examples of copolymers within the scope of the present invention are commercially available as, for example, Synperonic PE, Synperonic T, or Synperonic LF.

Other types of surfactants, including cationic and anionic surfactants may also be used. However, in this embodiment, any surfactant used should cause agglomeration of the ink particles, and preferably facilitate adherence of the ink agglomerates to the pulp. Adherence is to be interpreted as a tendency for the ink agglomerates to remain with the pulp, rather than being dispersed through, and subsequently removed with the repulping liquor.

The dosage level of surfactant is of importance in aiding in the formation of ink agglomerates of a suitable size. It has been found the excessive surfactant will cause the dispersion of the ink as small agglomerates throughout the pulp. Accordingly, it is necessary to determine the correct level of surfactant which must be utilized in order to cause the formation of suitable sized agglomerates.

Accordingly, the level of surfactant may vary depending on the surfactant type, efficiency, waste paper source, ink types and volumes, temperature of the repulping operation and the like. However, in general, during repulping, the copolymers of the present invention are preferably used at levels of from 0.01 to 1.0%, more preferably 0.1 to 0.7%, and still more preferably at levels of from 0.2 to 0.5%, expressed on a 100% weight basis, as a weight percentage of the oven dried weight of the pulp. Further, the level of surfactant added may be adjusted in consideration of the recycle of surfactant in the process water used during pulp treatment, in order that the level present in the repulper is maintained within the above preferred levels.

The repulping liquor may also comprise a mixture of compatible surfactants in addition to other repulping additives.

The term surfactant is used in a general sense throughout this application, and includes those chemicals which may be termed in the industry as dispersants, collectors, wetting agents, displectors, anti-deposition aids, and the like.

In the present invention "repulping" preferably comprises mere mixing and agitation of the waste paper with the surfactant of the present invention under the conditions as set out hereinbelow.

A major advantage of the present invention is that repulping can be conducted under conditions more suitable for use in a pulp mill. For example, the process is preferably conducted at 1 to 15% consistency, preferably 3 to 9% consistency, at a pH of less than 8, and preferably between 4 and 7.0, for 1 to 60 minutes, and preferably 5 to 30 minutes, at a temperature of 10 to 70° C., and preferably 40 to 60° C. Further, the present process also permits the elimination of the use of caustic, hydrogen peroxide, and silicate, and replaces them with the surfactants defined. Only a small amount of a suitable acid, such as for example, sulphuric acid, or even a small amount of caustic, may optionally be added to adjust the pH of the repulping liquor to a desired value.

As described hereinabove, the processes of the present invention may also comprise feeding said recycled pulp to a bleach stage prior to feeding the pulp to a paper-making machine. Any suitable bleaching stage typically used for deinked pulp, and in particular, used for deinked mechanical pulp, such as bleaching with hydrogen peroxide, may be subsequently utilized to increase the brightness of the recycled paper.

A significant advantage of retaining the ink agglomerates with the pulp is the reduction of the amount of ink sludge which is normally generated during deinking operations.

The ink agglomerates formed preferably have a diameter of between 2 and 80 µm (or microns), more preferably between 2 and 60 µm and even more preferably between 2 and 20 µm. The agglomerates are also preferably smooth and essentially spherical, and thus have a small surface area. Thus, the agglomerates are preferably small enough that they are not visible, but are large and numerous enough so that they contain a relatively large proportion of the ink particles removed from the pulp.

Not all of the ink agglomerates are within this range, but preferably greater than 50% of the ink, and more preferably, greater than 80%, is contained within ink agglomerates within the ranges specified.

The present invention may be used with most sources of waste paper. However, the invention is most effective with papers printed by offset or letterpress techniques. In particular, waste paper consisting essentially of old newspapers (ONP), or a combination of ONP with upgraded groundwood-containing grades, including improved newsprint and filler-containing specialty groundwood papers, are preferred. Coated papers, from magazines for example, may be used to a limited extent. Further, ledger grade recycled paper may also be used provided that the content of toner-printed papers is low.

The quality of the waste paper furnish can affect the final quality of the treated pulp. With essentially contaminant-free ONP, such as for example newspaper overissue, the treated pulp can be used, without further treatment, in a paper machine at levels of, for example, 30% of the furnish. Postconsumer waste paper, however, is often contaminated with interfering substances, such as address label glues and the like, which can form troublesome contaminants generally referred to as "stickies". These materials contaminate various parts of the paper-making machine and associated equipment, and can cause quality-reducing holes or thin spots in the paper produced. Although these problems can be minimized by periodic machine clean-ups, and machine wire sprays that inhibit the attachment of stickies to the drainage wire, the maximum allowable proportion of the ONP recycled may be limited by the level of contaminants.

A limited degree of post-repulper treatment allows for the use of a greater proportion of contaminated recycled fibres. For example, the pulp can be passed through an in-line deflaker to break up some of the larger contaminants, along with imperfectly repulped fibre bundles. Alternatively, the pulp can be passed through pulp screening or pulp cleaning equipment in order to improve the quality of the contaminated wastepaper.

In general, the effectiveness of a waste paper treatment process may be indicated by measuring the brightness of the pulp according to the standard brightness tests used in the industry. Traditionally, a higher brightness for deinked paper has generally indicated that more ink has been removed from the pulp. In the present invention, it has been found that the addition of surfactant to the repulper provides improved brightness over a control process of merely mixing the pulp in the absence of any other chemicals. Preferably, however, the ink particles are formed into ink agglomerates, and the ink agglomerates are of sufficient size to contain relatively large numbers of ink particles. Accordingly, the brightness of the treated pulp is not significantly reduced by ink particles spread throughout the paper. Further, when the ink agglomerates are small enough to be essentially invisible to the naked eye, there are few, if any, ink "specks" present in the final paper products.

Since the ink agglomerates have a relatively small surface area, are small enough to be below the visual range, and yet are large enough that they contain a large proportion of the ink that was originally present in the wastepaper, the pulp generated by the process of the present invention has improved brightness compared to the brightness which would normally be achieved in a repulper, and is comparable to the brightness usually achieved from traditional deinking operations. This is accomplished in spite of the retention of the ink removed from the wastepaper, since the retained ink is held in the paper in a manner so that it has minimal effect on the brightness or general appearance of the deinked paper.

Even in situations where the brightness of the treated pulp is less than that which could be achieved by standard deinking operations, the present invention allows for the elimination of the capital costs of traditional deinking machinery, and thus may be an acceptable trade-off against the lower brightness levels.

Preferably, however, the treated pulp of the present invention has a brightness of at least 48% ISO, and more preferably at least 54% ISO, after leaving the repulping stage.

A further advantage of the present invention is that the effluent from the treatment process is less coloured than in traditional deinking operations, since a large portion of the ink from the wastepaper remains with the pulp, rather than being removed from the system. Further, any ink removed from the pulp is agglomerated into non-visible ink agglomerates, and thus, the appearance of the effluent from the treatment process is significantly lighter than the dark appearance of more traditional deinking operations.

Embodiments of the processes of the present invention are demonstrated in the following non-limiting examples. In all examples, a common waste paper source comprised of ONP was used. All concentrations are on a weight basis expressed as a percentage on oven-dried pulp weight.

EXAMPLE 1

A wastepaper sample was repulped in a Lamort semi-pilot scale repulper fitted with a Helico blade. The repulping liquor contained water only, and thus, is not in accordance with the present invention. Repulping was conducted at 5% consistency, for 1 hour at 45° C., until the pulp was defibred. The initial pH of the aqueous slurry was 7.0 and decreased to 6.5 after the treatment was completed.

The pulp fibres and liquor were separated, and each were visually and microscopically examined for the presence of ink particles. The brightness of a paper sheet made from the deinked paper was also measured using an Ultrascan spectrophotometer.

Ink was found to be present in both the pulp and in the effluent liquor as smudgy particles. The brightness of the pulp was measured as 41% ISO.

EXAMPLE 2

A second wastepaper sample was repulped in a repulper under the same conditions as in Example 1. However, the repulping liquor contained a commercially available nonyl phenol ethoxylate dispersant which promoted the removal of the ink particles from the pulp, but did not promote the agglomeration of the ink particles into ink agglomerates which adhered to the pulp fibres.

The surfactant was added at a concentration of 0.5% by weight of oven-dried pulp. No caustic, silicate, or peroxide was added to the repulper, and the initial and final pH values for the aqueous slurry were 7.0 and 6.5 respectively. After repulsing, the treated pulp had a brightness of 51% ISO, and the collected liquor was slightly darker than the liquor collected in Example 1.

EXAMPLE 3

The experiment of Examples 1 and 2 was repeated with the addition of 0.5% by weight of a commercially available fatty alcohol alkoxy late surfactant (a ethylene oxide/propylene oxide copolymer on a fatty alcohol base) having an approximate molecular weight of 1100.

After repulping, the paper collected had a brightness of 54.0% ISO. In addition, the liquor collected was almost water white, and was free from the inky/black appearance common to the liquors collected in Example 1. Only a relatively small number of ink particles were observed in the collected liquor.

An analysis of the paper revealed the presence of a number of ink agglomerates having a diameter of 2 to 80 µm, including a plurality of smooth, generally spherical, ink agglomerates having a diameter of 30–55 µm.

EXAMPLE 4

A further wastepaper sample was repulped in a repulper under the same conditions as in Example 1. However, the repulping liquor contained a commercially available polyoxyethylene sorbitol lanolin derivative surfactant which promoted the removal of the ink particles from the pulp, but did not promote the agglomeration of the ink particles into ink agglomerates which adhered to the pulp fibres to the same extent as that observed in Example 3.

The surfactant was added at a concentration of 0.5% by weight of oven-dried pulp. No caustic, silicate, or peroxide was added to the repulper, and the initial and final pH values for the aqueous slurry were 7.0 and 6.5 respectively. After repulping, the treated pulp had a brightness of 51% ISO, and the collected liquor was slightly lighter than the liquor collected in Example 1.

Accordingly, the above examples demonstrate that processes of the present invention are capable of effecting treatment of wastepaper in the repulping stage of a waste paper treatment process. Further, it is demonstrated that the ink particles initially present on the wastepaper, may be converted to, and subsequently removed as, larger ink agglomerates during repulping. Further, these ink agglomerates are dispersed throughout, and thus are retained within, the treated pulp. The process of the present invention thus allows for an improvement in brightness of the recycled paper, and, in a preferred embodiment, permits a reduction in the amount of ink sludge which must be collected from the effluent of a prior art waste paper treatment process.

Having described specific embodiments of the present invention, it will be understood that modifications thereof may be suggested to those skilled in the art, and it is intended to cover all such modifications as fall within the scope of the appended claims.

The embodiments of the invention in which an exclusive property or privilege is claimed are defined as follows:

1. A waste paper treatment process comprising:
   (i) mixing a waste paper, having a plurality of attached ink particles, with water to form an aqueous waste paper slurry;
   (ii) treating said waste paper slurry with an ethylene oxide, propylene oxide copolymer surfactant, while agitating said slurry so as to dislodge said ink particles from said paper; and
   (iii) removing the water from said slurry and collecting said pulp to produce a recycled pulp,
   wherein during step (ii) said ink particles agglomerate into larger diameter ink agglomerates and more than 50% of the ink initially present in said waste paper is not removed from the waste paper during treatment but is retained with said recycled pulp, and is present as essentially non-visible agglomerates having a diameter between 2 and 80 µm.

2. A waste paper treatment process as claimed in claim 1 wherein the level of surfactant is from 0.01 to 1.0% by weight on oven dried pulp.

3. A waste paper treatment process as claimed in claim 1 wherein the level of surfactant is from 0.2 to 0.5%.

4. A waste paper treatment process as claimed in claim 1 wherein said repulping is conducted at 3 to 9% consistency, at a pH of 4 to 7, for 5 to 30 minutes at a temperature of 10 to 70° C.

5. A waste paper treatment process as claimed in claim 4 wherein said repulping is conducted at 40 to 60° C.

6. A waste paper treatment process as claimed in claim 1 wherein said repulped pulp has a brightness of at least 48% ISO.

7. A waste paper treatment process as claimed in claim 1 wherein said ink agglomerates have a diameter of between 2 and 60 µm.

8. A waste paper treatment process as claimed in claim 1 wherein said ink agglomerates have a diameter of between 2 and 20 µm.

9. A waste paper treatment process as claimed in claim 1 wherein said ink agglomerates are smooth and essentially spherical.

10. A waste paper recovery process comprising a waste paper treatment process as claimed in claim 1, followed by a wash or flotation deinking stage.

11. A waste paper treatment process as claimed in claim 1 wherein said waste paper consists essentially of old newspapers (ONP).

12. A short sequence waste paper repulping process for generating a waste paper pulp comprising:
   mixing a waste paper, having a plurality of attached ink particles, with water to form an aqueous waste paper slurry;
   treating said waste paper slurry with an ethylene oxide, propylene oxide copolymer surfactant, while agitating said slurry so as to dislodge said ink particles from said paper and agglomerate said ink particles into larger diameter ink agglomerates, and thus form a pulp and ink agglomerate mixture, wherein said slurry is essentially free from added silicate, caustic, and/or hydrogen peroxide; and, feeding said surfactant-treated mixture to a paper-making machine, without the use of a wash or flotation deinking stage, in order to remove the water from said mixture and thus from a recycled pulp, wherein more than 50% of the ink initially present in said waste paper is not removed from the waste paper during treatment but is retained with said recycled pulp as essentially non-visible agglomerates having a diameter between 2 and 80 μm.

13. A short sequence waste paper repulping process as claimed in claim 12 wherein the level of silicate, caustic and hydrogen peroxide are each below 0.5% by weight on oven dried pulp.

14. A short sequence waste paper repulping process as claimed in claim 12 wherein the level of silicate, caustic and hydrogen peroxide are each below 0.1% by weight on oven dried pulp.

15. A short sequence waste paper repulping process as claimed in claim 12 wherein the pH of the aqueous waste paper slurry is less than 8.

16. A short sequence waste paper repulping process as claimed in claim 12 wherein the pH of the aqueous waste paper slurry is between 4 and 7.

* * * * *